United States Patent [19]

Maekawa et al.

[11] Patent Number: 5,010,364
[45] Date of Patent: Apr. 23, 1991

[54] COPIER WITH AUTOMATIC DOCUMENT FEED HAVING JAM PREVENTION FUNCTION

[75] Inventors: Yoshikazu Maekawa; Tetsuo Hirata, both of Tokyo, Japan

[73] Assignee: Konica Corporation, Tokyo, Japan

[21] Appl. No.: 473,475

[22] Filed: Feb. 1, 1990

[30] Foreign Application Priority Data

Feb. 3, 1989 [JP] Japan .................................. 1-23673
Feb. 3, 1989 [JP] Japan .................................. 1-23674

[51] Int. Cl.⁵ ............................................. G03G 21/00
[52] U.S. Cl. .................................... 355/207; 271/227; 271/263; 355/203; 355/206; 355/308
[58] Field of Search ................. 355/75, 203, 205, 206, 355/207, 230, 231, 308, 311; 271/245, 263, 227

[56] References Cited

U.S. PATENT DOCUMENTS

| | | | |
|---|---|---|---|
| 3,804,514 | 4/1974 | Jasinski | 355/75 |
| 3,910,570 | 10/1975 | Bleau | 271/245 |
| 4,322,160 | 3/1982 | Kobus | 271/245 X |
| 4,344,703 | 8/1982 | Nezu et al. | 271/245 X |
| 4,428,666 | 1/1984 | Phelps et al. | 271/245 X |
| 4,429,863 | 2/1984 | Itoh et al. | 271/245 X |
| 4,433,909 | 2/1984 | Goes in Center et al. | 355/75 |
| 4,470,591 | 9/1984 | Acquaviva | 355/75 X |
| 4,589,651 | 5/1986 | Silverburg | 271/227 X |
| 4,629,315 | 12/1986 | Brugger | 271/245 X |
| 4,763,160 | 8/1988 | Honjo | 355/205 X |
| 4,910,552 | 3/1990 | Migita et al. | 355/207 X |
| 4,947,206 | 8/1990 | Ito | 271/308 X |

Primary Examiner—A. T. Grimley
Assistant Examiner—J. E. Barlow, Jr.
Attorney, Agent, or Firm—Finnegan, Henderson, Farabow, Garrett, and Dunner

[57] ABSTRACT

An apparatus with a document feeder for sequentially copying plural sheets of documents. When a document longer than a predetermined length is detected by a sensor, a stopper for aligning the document at a predetermined position is withdrawn in order to prevent the document from being damaged. At the same time, an indicator is turned on, warning the operator of jamming.

5 Claims, 6 Drawing Sheets

COPIER WITH AUTOMATIC DOCUMENT FEED HAVING JAM PREVENTION FUNCTION

BACKGROUND OF THE INVENTION

This invention relates to an electrostatic copier which automatically feeds and delivers documents to be copied.

In order to copy a plurality of documents with a conventional copier, each document should be manually set on a platen glass located in the upper portion of the apparatus, and also removed from the platen glass to be replaced by the next document. However, this exchange of the documents is a very troublesome job when copying many documents.

Recently a new apparatus, which is called an automatic document feeder, has been developed. The procedure of feeding documents by the automatic document feeder will be described as follows. After a plurality of documents to be copied are set at a prescribed position on the automatic document feeder, the documents are automatically conveyed sheet by sheet onto the prescribed position on the platen glass. The document is exposed on the platen glass. After exposure, the document is automatically delivered. The automatic document feeder is used either as a built-in device of the copier or as an optional accessory to the conventional copier as occasion demands.

The procedure of copying a plurality of documents by an electrostatic copier equipped with this kind of automatic document feeder is as follows. A plurality of documents to be copied are initially stacked at the prescribed position on the automatic document feeder and the copy button, which is mounted on the operation panel of the copier, is pressed. Then, the document feeding mechanism of the automatic document feeder is activated and a sheet of document, the uppermost or the lowermost of a pile of documents on the document feeder, is conveyed onto the platen glass. The conveyed document is stopped at the prescribed position on the platen glass by the stopping device which protrudes a little from the platen glass surface. After the document is thus aligned at the prescribed position on the platen glass, the optical scanning unit installed just below the platen glass moves and exposes the document from the underside to the light of a lamp. The reflected light from the document is projected on the surface of the photoreceptor. Then, a document image is formed by a series of electrophotographic processes. Likewise afterward, each of the documents are automatically conveyed and processed as described above.

This type of copier is usually designed to copy those documents belonging to a predetermined size group, as an example B5 and A4, the upper size limitation of this size group being A4 here.

And problems are caused by a careless setting of a document which is longer than the upper size limitation, which we call long document hereafter in the specification, to the document feeder. In this case, when the copying operation starts, the long document is conveyed onto the platen glass, and after the leading edge of the document is halted by the stopping device, the trailing portion of the document is still conveyed by the feed roller. As a result, the leading edge of the document is damaged or the trailing portion of the document is bent and wound around the feed roller, which may cause jamming of the apparatus in addition to damage of the document.

SUMMARY OF THE INVENTION

It is an object of the present invention to provide an improved electrostatic copier with a document feeder which can prevent a document from being damaged when it is fed onto the platen glass. In order to attain the object described above, when a long document is detected by a sensor, the document stopping device is withdrawn and at the same time the indicator which warns the operator of jamming turns on. Another example to attain the object of the invention is that when a long document is detected, the document stopping device is withdrawn and the document is continuously discharged from the apparatus.

DETAILED DESCRIPTION OF THE PREFERRED EMBODIMENTS

Figure 1:
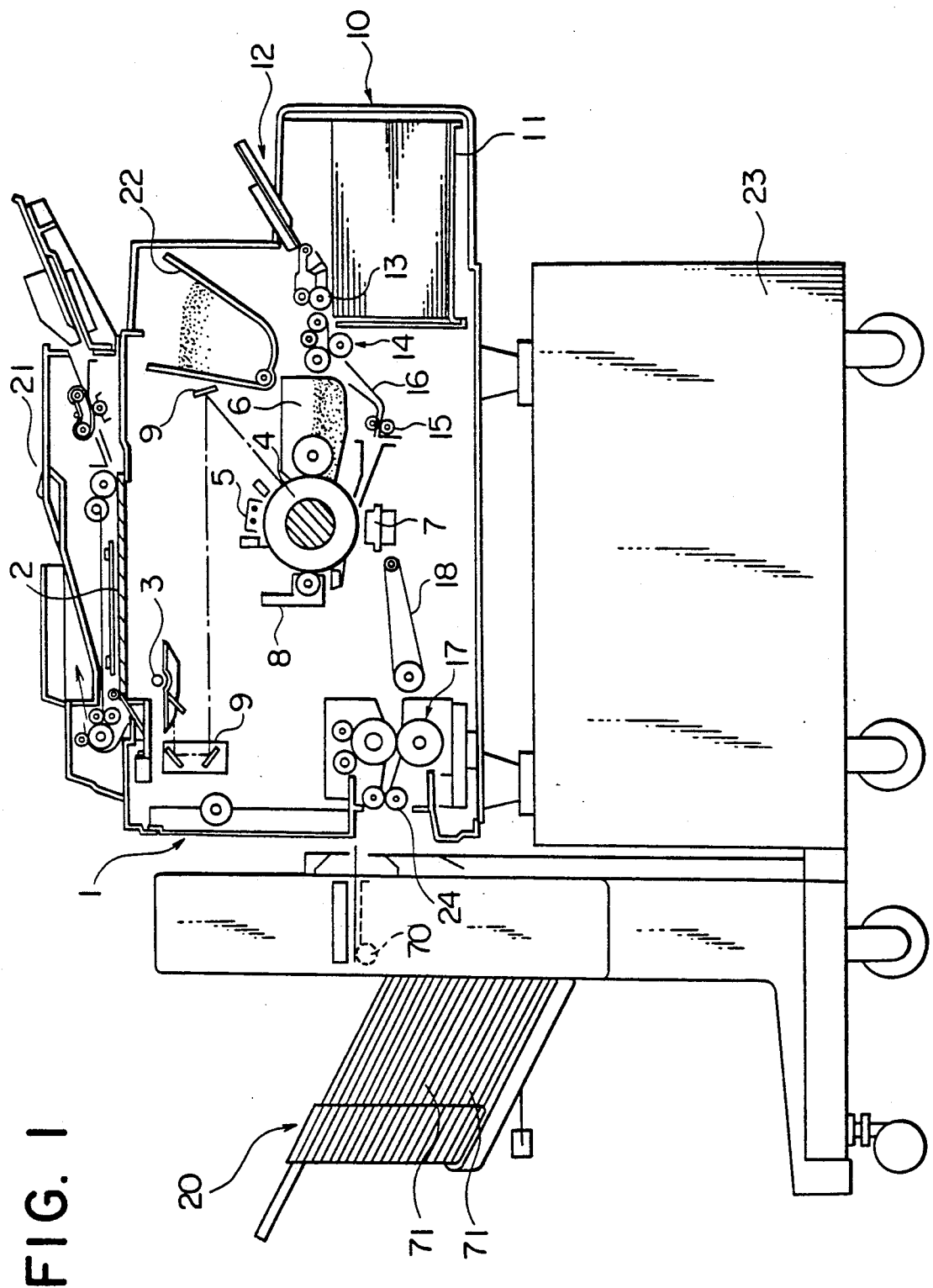
FIG. 1 is a schematic illustration of an electrostatic copier as an embodiment of the present invention.

Referring to the drawings, an exemplary embodiment of the invention will be described below.

FIG. 1 is a schematic illustration of one of the examples of the electrostatic copier of the invention. A paper feed unit which contains a plurality of recording papers and is capable of rising and falling, and a sorter which can automatically sort copied recording papers, are installed in this example. However, these two units are not essential to the present invention. In the electrostatic copier illustrated in FIG. 1, the platen glass 2 is mounted on the upper portion of the apparatus 1. On the underside of the platen glass 2, the exposure unit 3 is installed which can be horizontally reciprocated to expose the document, which is not shown in the drawing, on the upper surface of the platen glass 2.

In the middle portion of the apparatus 1, is the photoreceptor drum 4 to bear a latent image on its surface. The following units are placed around the photoreceptor drum 4: the electrostatic charging unit 5, the developing unit 6, the transfer and separating unit 7, and the cleaning unit 8.

The recording paper feed unit 10 is connected to the right side of the apparatus 1. The recording paper feed unit 10 is equipped with the lifting base 11 on which a plurality of recording papers can be stacked. The hand feeding unit 12 is mounted on the upper portion of the recording paper feed unit 10. At the uppermost portion of the recording paper unit 10, the recording paper feed roller 13 is mounted which comes into contact with the uppermost recording paper stacked on the lifting base 11. This recording paper feed roller 13 is driven by a motor not shown in the drawing. Furthermore, the double-feed preventing mechanism 14 is placed ahead of the recording paper feed roller 13 in the direction of paper conveyance. Between the double-feed preventing mechanism 14 and the transfer and separating unit 7 placed close to the photoreceptor drum 4, the recording paper passage 16 and the second recording paper feed roller (the resisting roller) 15 which stops and holds a conveyed recording paper for a while before feeding again, are placed. In the left portion of the apparatus, the fixing unit 17 is installed. Between the fixing unit 17 and the photoreceptor drum 4, the conveying unit 18 is installed which conveys the recording paper after transfer.

Furthermore, the sorter 20 is connected to the left side of the apparatus 1 and the automatic document feeder 21 is mounted on the upper portion of the apparatus 1. The numeral 22 is a hopper to supply toner to the developing unit 6. The numeral 23 is a stand to adjust the height of the delivery roller 24 which delivers a recording paper from the apparatus 1 with the height of the sorter 20.

Figure 2:
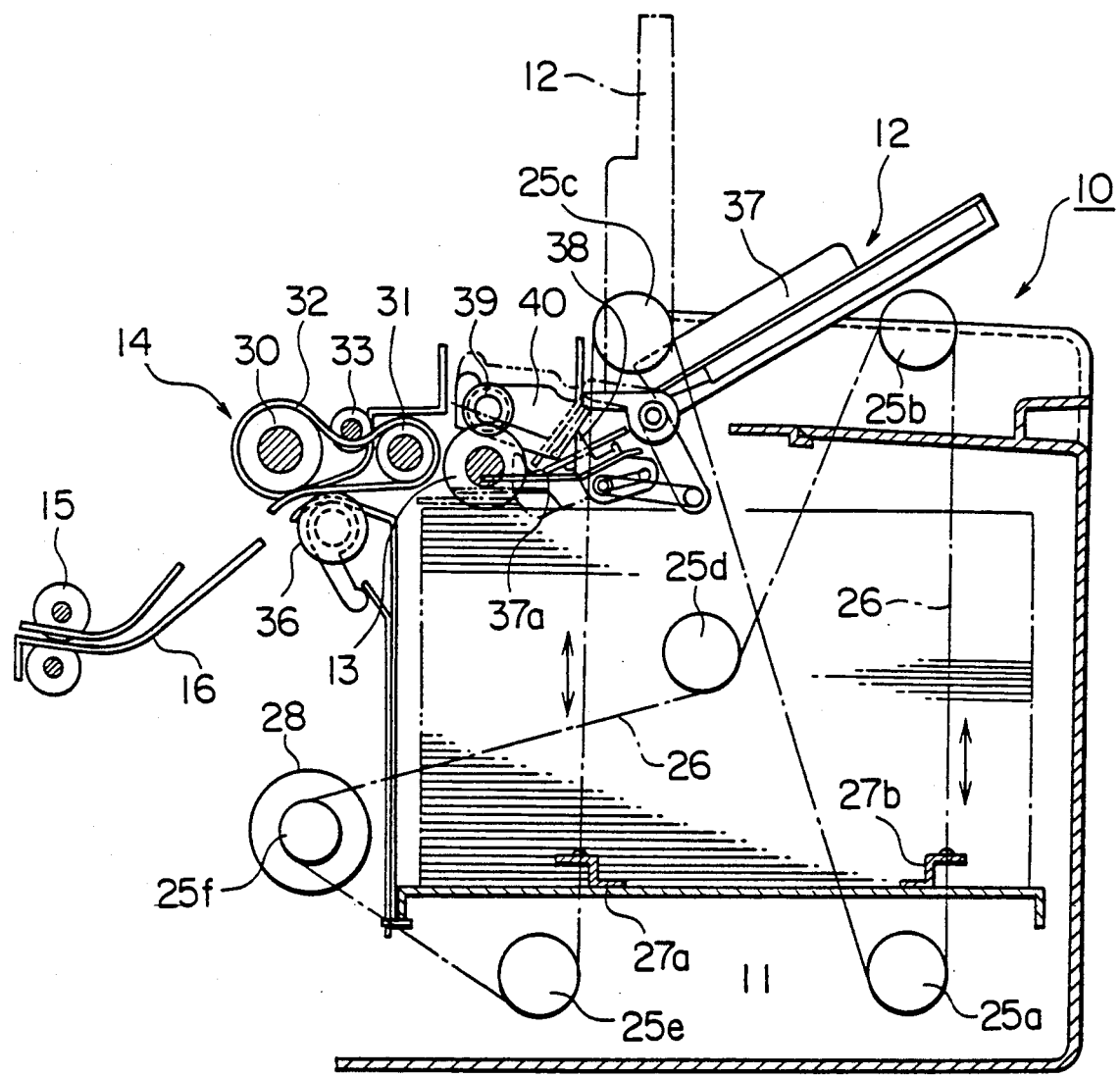
FIG. 2 is a fragmentary sectional view of the document delivery unit and related portions of the electrostatic copier illustrated in FIG. 1.

The detailed structure of the recording paper feed unit 10 is illustrated in FIG. 2. The lifting base 11 of the recording paper feed unit 10 is connected via fixture members 27a and 27b to the stainless steel wire 26 (shown by a chain line) which is stretched by the pulleys 25a, 25b, 25c, 25d, 25e, and 25f. When the motor 28 is rotated normally or reversely, the lifting base 11 rises or falls in the arrowed direction in accordance with the motion of the stainless steel wire 26. The movable recording paper feed roller 13 is located at the upper left portion of the recording paper feed unit. The double feed preventing mechanism, the details of which will be described below, is located ahead of the recording paper feed roller 13. The double feed preventing mechanism comprises: a pair of rollerS 30, 31 Which are placed ahead of the recording paper feed roller 13 in the paper feeding direction; the belt 32 which is stretched between the roller 30 and the roller 31; the tension roller 33 which presses the belt 32 from above: and the conveyance roller 36 which presses the belt 32 from below. The passage 16 is provided ahead of the double feed preventing mechanism and at the end of the passage a pair of rollers, the second recording paper feed rollers 15 (the resisting rollers) are provided. The conveyance roller 36 is driven by the same motor (not shown in the drawing) as that which drives the recording paper feed roller 13.

The hand feeding unit 12 is provided in the vicinity of the recording paper feed roller 13 which is placed at an upper part of the lifting base 11. The hand feeding board 37 of the hand feeding unit 12 can move between the raised position illustrated by a chain line and the lowered position illustrated by a solid line. When the hand feeding board 37 of the hand feeding unit 12 is moved from the raised position to the lowered position, the mode changes from the automatic feeding mode to the hand feeding mode and the mode change is electrically detected by the photo coupler (not shown in the drawing). At the same time, the lever 38 which is integrally moved with the hand feeding board 37, is moved from the position illustrated by a solid line to the position illustrated by a chain line. When the lever 38 is moved, the recording paper feed roller 13 is lifted since the support lever 40 of the press roller 39 which holds the recording paper feed roller 13 at the lower position shown in the drawing, is pushed up. Accordingly, when the tip 37a of the hand feeding board 37 is moved from the position shown by a solid line to the position shown by a chain line, the lower surface of the recording paper feed roller 13 is positioned to the same surface as the upper surface of the tip 37a of the hand feeding board 37.

As a result, when the recording paper feed roller 13 is positioned at the raised position, the uppermost recording paper of a stack on the lifting base 11 is not fed but left on the stack, and the uppermost recording paper of a plurality of recording papers on the hand feeding board 37 of the hand feeding unit 12, is fed.

Figure 3:
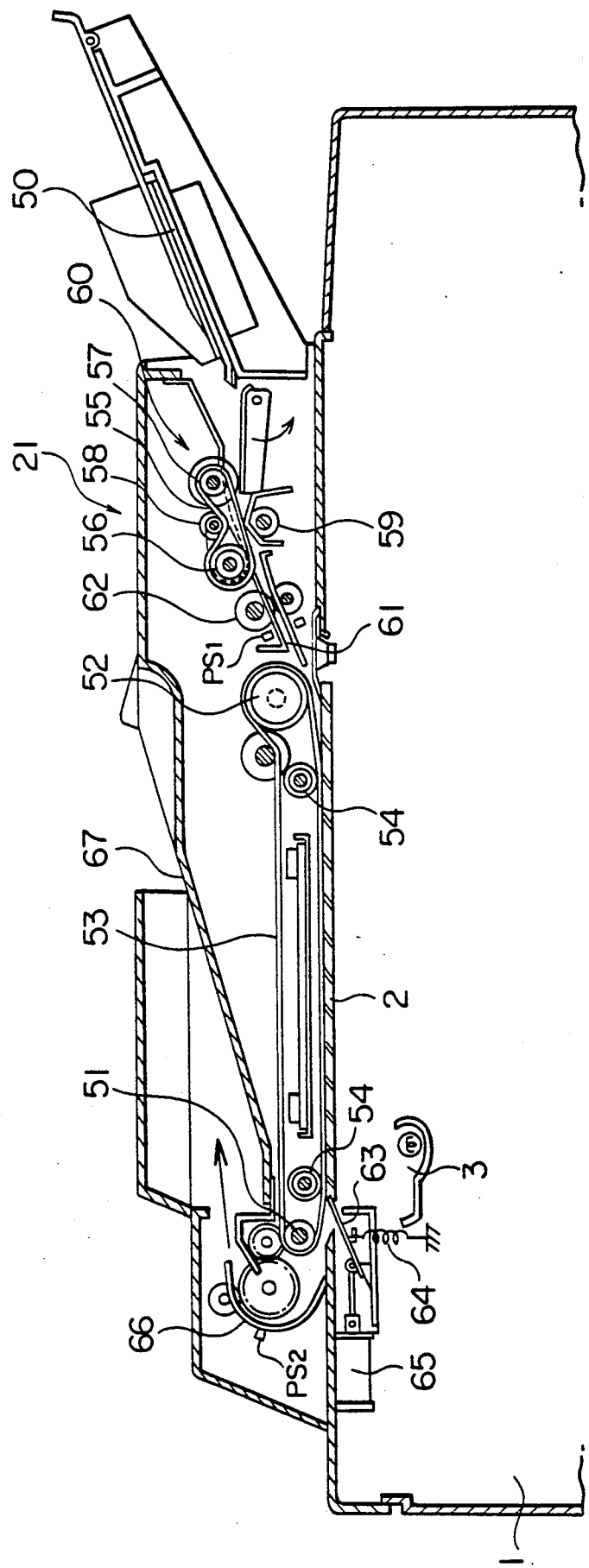
FIG. 3 is a schematic illustration which shows the structure of the automatic document feeder used together with the copier illustrated in FIG. 1.

The automatic document feeder 21, which is illustrated in FIG. 3 in detail, is placed on the platen glass 2 which is provided on the upper surface of the electrostatic copier 1. The document tray 50 is provided on the right side of the document feeder 21.

The automatic document feeder 21 is equipped also with a pair of rollers 51, 52 which are placed on the platen glass 2 at a prescribed interval. The belt 53 is stretched between the roller 51 and the roller 52. The belt is pressed against the upper surface of the platen glass 2 by the press rollers 54. The double feed preventing mechanism 60 is placed between the belt 53 and the document tray 50 and comprises a pair of rollers 56, 57 between which the belt 55 is stretched, the tension roller 58 which presses the belt 55 from above, and the conveying roller 59 which presses the belt 55 from below. The passage 61 is provided ahead of the double feed preventing mechanism 60 in the document feeding direction. A pair of feed rollers 62 (the resisting rollers) are provided at the tip of the passage. A document is conveyed to be inserted between the belt 53 and the platen glass 2 by a pair of rollers 62. Optical sensor $PS_1$ is placed close to the feed rollers 62 in the downstream portion of document flow.

The document stopping device 63 for positioning a document on the platen glass is provided at the downstream end of the platen glass 2 with an angle to the platen surface. This stopping device 63 is pressed against the platen glass 2 by the spring 64. On the other hand, the stopping device 63 is connected with the rod of the plunger 65. When the plunger 63 is activated, the tip of the stopping device 63 protrudes above the platen glass surface as the plunger force is stronger than the spring force. The numeral 66 is a guide for an exposed document. The numeral 67 is a document delivery tray. Optical sensor PS, which detects a jammed documents, is provided at a point halfway along the guide.

Referring to FIG. 1, a recording paper which has been fixed by the fixing unit 17 which is provided in the electrostatic copier 1, is delivered by the delivery roller 24 and sorted by the roller 70 of the sorter 20 to be stored in the bin 71 of the sorter The recorded paper to be stored into the bin 71, is sorted on right and left with regard to the paper delivery direction. Accordingly, the recorded paper is sorted into two groups in a bin.

The following is to explain the motion of a copier as an example of the embodiments of this invention.

Figure 4:
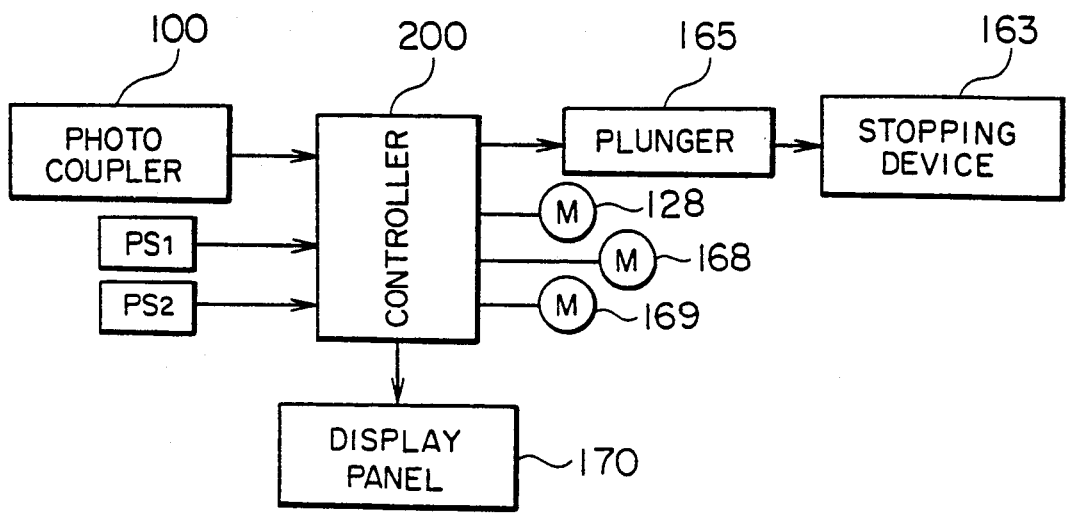
FIG. 4 is a block diagram of the control circuit of the electrostatic copier of the present invention.
Figure 5:
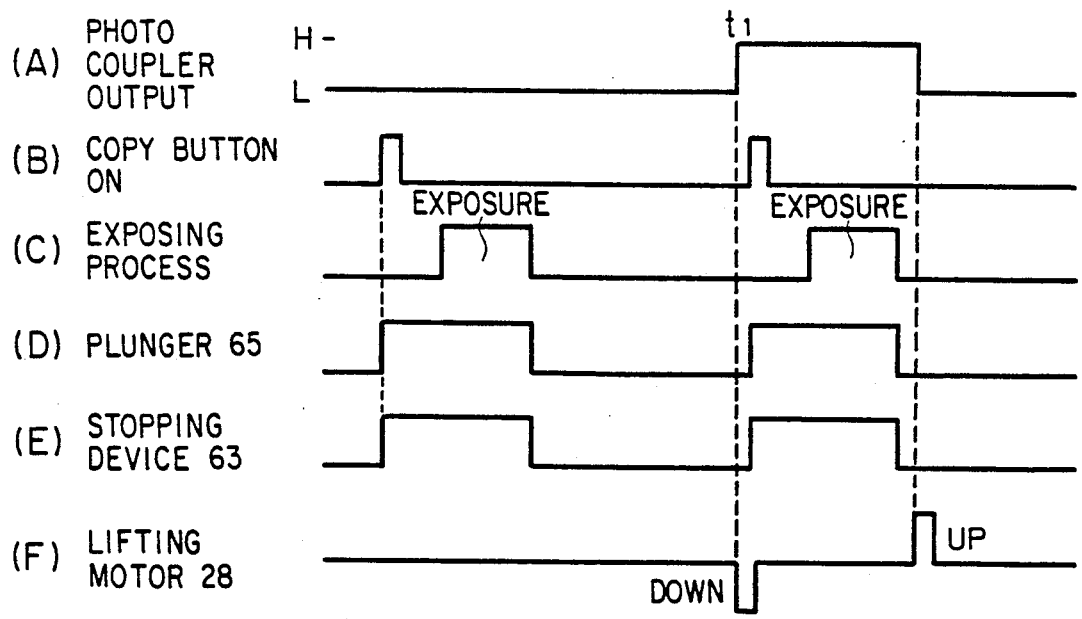
FIG. 5 is a timing chart of the signals in the control circuit of FIG. 4.

FIG. 4 is a part of the control circuit diagram of the electrostatic copier of the invention. FIG. 5 is a timing chart of the signals which relate to the control of the copier.

At first, several documents are placed on the document tray 50 of the automatic document feeder 21 and a plurality of recording papers are placed on the lifting base 11 of the recording paper feed unit 10. At this moment, the hand feeding unit 12 is at the raised position as illustrated by a chain line in FIG. 2.

By pressing the copying button after the selection of automatic feeding mode, document conveyance motor 60 begins to rotate, and the first document sheet on the document tray 50 of the automatic document feeder 21 is conveyed by the conveying roller 59 to the platen glass.

At the same time the plunger 65 is activated and the stopper 63 protrudes from the surface of the platen glass.

In the mean, time the conveyed document transfers through the passage 61 to a pair of feed rollers 62 to be stopped and wait there for a while.

After the predetermined time, the document is sent from the feed roller 62 onto the platen glass 2 and conveyed further on the platen glass 2 by the belt 53 driven by the motor 69 to the predetermined position, where it is hampered and stopped by the stopping device 63, the tip of which is protruded above the surface of the platen glass 2. The document is then exposed on the platen glass 2 by the exposure unit 3. The reflected light from the document is transmitted through a group of mirrors 9 to the photoreceptor drum 4 which is electrostatically charged by the electrostatic charging unit 5, and the electrostatic latent image is formed on the surface of the photoreceptor drum 4. After that, the latent image is developed by the developing unit 6 and sent to the transfer and separating unit 7.

During this interval the uppermost recording paper of the recording paper stack on the lifting base 11 of the recording paper feed unit 10 is conveyed by the recording paper feed roller 13. At that time, double feeding is prevented by the double feed preventing mechanism 14. When the leading edge of the recording paper reaches at the second recording paper feed roller 15, the recording paper is halted and kept waiting in the passage 16.

The electrostatic latent image formed on the photoreceptor drum 4 by a sequence of electrophotographic processes is conveyed to the transfer and separating unit 7 in accordance with the rotation of the drum 4, then the recording paper in the passage 16 is sent to the transferring position by the second recording paper feed roller 15. The image is transferred onto the recording paper by the transfer and separating unit 7, and the recording paper is separated from the drum 4 by the transfer and separating unit 7. After that, the recording paper is conveyed to the fixing unit 17 by the conveying member 18. After the image is fixed on the recording paper, the recording paper is conveyed into the sorter 20 by the delivery roller 24.

The recording paper on which the image is recorded, is delivered to the bin 71 by the roller 70. Since the bin 7 is moved at this moment upwards and downwards by a drive unit not shown in the drawing, the recording paper is delivered to the bin 71 in order.

The first document exposed on the platen glass 2 is conveyed along the guide 66 of the automatic document feeder 21 onto the upper surface of the delivery tray 67. While this motion is conducted, the second document is sent out from the document tray 50. After that, the same motions are repeated to copy the succeeding documents. The recorded papers are sorted by the sorter 20 and stored in each bin.

To copy a document of different size on a recording paper of different size at a time point $t_1$ in the half way or after the completion of the automatic feeding mode described above, the hand feeding board 37 which is in the raised position as shown by a chain line in FIG. 2, is pushed down to the lowered position as shown by a solid line in FIG. 2.

The electrostatic copier is switched from the automatic feeding mode to the hand feeding mode by this motion, and the output of the photo coupler 100 changes as shown in FIG. 5 (A), from L to H in this example. At the same time, the recording paper feed roller 13 is raised by the action of the lever 38 in FIG. 2.

When the hand feeding mode is detected in this way, the motor 28 to drive the lifting base 11 is reversely rotated for a short time according to the direction from the controller 200 as shown in FIG. 5 (F). As a result, the lifting base 11 is lowered a little and the recording paper feed roller 13 is kept at the raised position by a mechanism not shown in the drawing. For that reason, the recording papers are smoothly fed along the hand feeding board 37 in the hand feeding mode.

When the copy button is pressed after that, the uppermost recording paper on the hand feeding board 37 is fed by the recording paper feed roller 13 and conveyed to the second recording paper feed roller 15 through the double feed preventing mechanism 14 in the same way as the recording paper stacked on the lifting base 11. Then, the recording paper is fed by the second recording paper feed roller 15 at a predetermined time so that an image can be transferred on the recording paper by the transfer and separating unit 7.

When the hand feeding board 37 is raised again after the hand feeding copy mode is completed, the output of the photo coupler 100 varies again as shown in FIG. 5 (A). It varies from H to L in this case. Accordingly, the motor 28 to lift the lifting base 11 is normally rotated for a short time and the lifting base 11 is raised to the original position.

Figure 6:
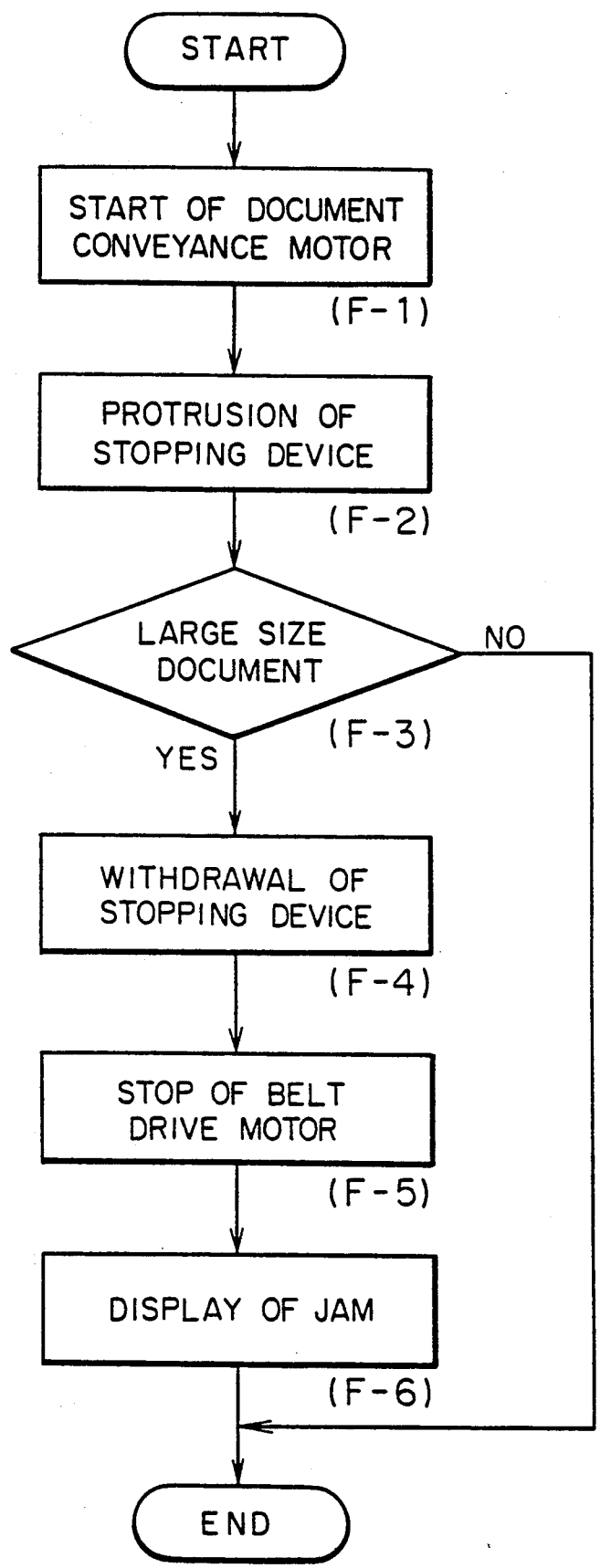
FIG. 6 and FIG. 7 are flow charts which explain the motions of the document feeder of the present invention.

The above are the copying motions when the document size is within the predetermined upper limitation. The copying motions when a long document which is longer than the said limitation is put on the document tray 50 by mistake, will be explained referring to the flow chart in FIG. 6.

In both the automatic feeding mode and the hand feeding mode, when the copy button is pressed, the automatic document feeder 21 operates in the same way as when a standard size document is put on document tray 50. The document conveyance motor 68 is rotated (F-1) and the first document is conveyed by the conveying roller 59. At the same time, the plunger 65 is activated and the tip of the stopping device 63 protrudes above the surface of the platen glass 2 (F-2).

When the leading edge of the document passes through optical sensor $PS_1$, a timer built in the controller 200 starts. When the time counted by the timer exceeds the passing time of the maximum standard size document, the controller 200 judges that the document is a long document (F-3) and turns off the activator of the plunger, wherein the passing time means the time consumed from the passing of the document's leading edge to the passing of the document's trailing edge. The tip of the stopping device 63 is withdrawn from the surface of the platen glass 2 by turning off the activator of the plunger (F-4). At this moment, the document conveyance motor 68 and the belt driving motor 69 which drives the belt 53, are stopped (F-5), and the jam indicator on the display panel is turned on (F-6).

Since the tip of the stopping device 63 is withdrawn before the long document's leading edge comes into contact with it, its leading edge is not damaged. Since the document conveyance motor 68 and the belt driving motor 69 are stopped, the long document is not deformed and a jam is not caused.

When the operator recognizes that the indicator is turned on, he can remove the long document by opening the cover.

As explained above, in the present invention, when a long document is detected by the automatic document feeder, the document stopping device is withdrawn and at the same time document feeding is stopped and the jam indicator is turned on. Therefore, damage of the long document can be surely prevented.

Figure 7:
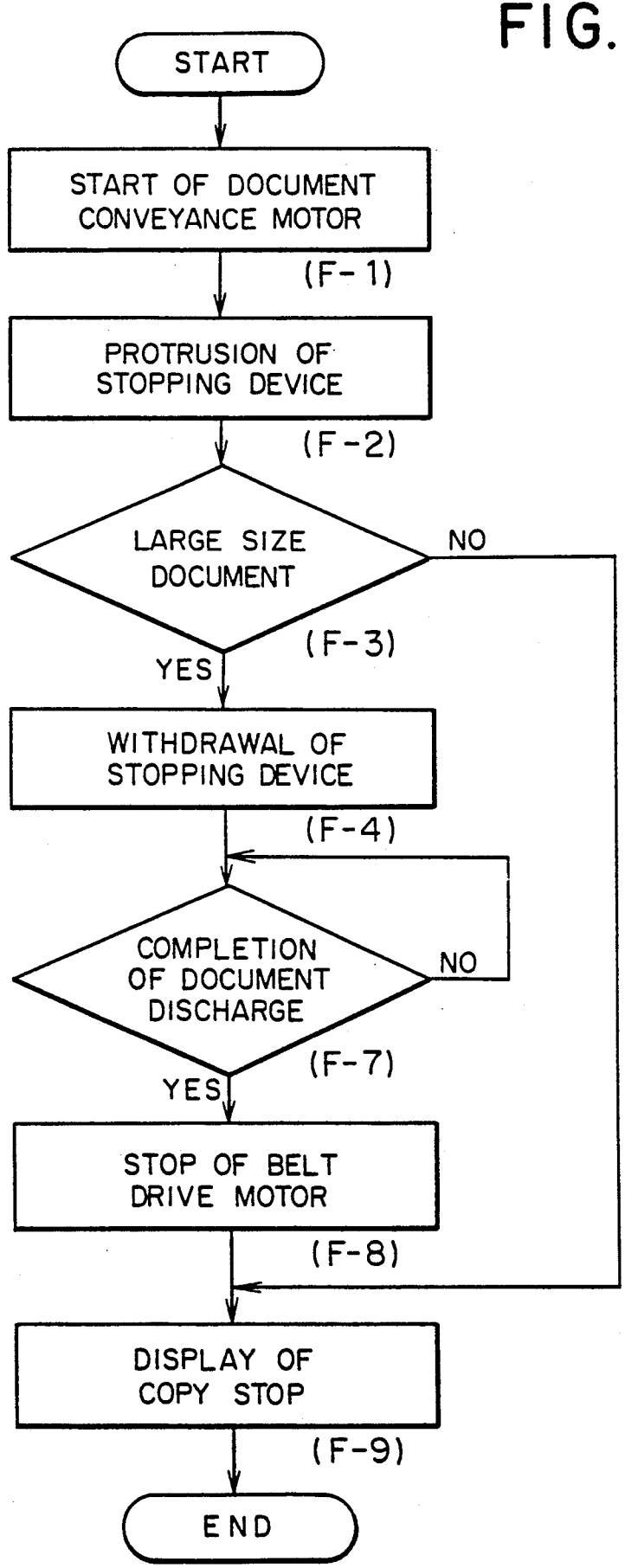

In the example shown in FIG. 7, after a long document is detected (F-3) and the stopping device is withdrawn from the surface of the platen glass 2, the document conveyance motor 68 and the belt driving motor 69 which drives the belt 53 are kept operating. Thus, the long document passes through the guide 66 and is delivered onto the document delivery tray 67. When optical sensor PS, detects the trailing edge of the long document and the controller 200 judges that delivery of the long document has been completed (F-7), the document conveying motor 68 and the belt driving motor 69 are stopped (F-8). After that, the indicator on the display panel is turned on, which indicates the document is too long to be copied (F-9).

Since the stopping device 63 is withdrawn before the leading edge of the long document comes into contact with the stopping device 63, the document's leading edge is not damaged. Furthermore, since the long document is completely discharged from the apparatus, it is not necessary to open the cover of the apparatus to remove the long document.

As explained above, in this example, when the automatic document feeder detects that the document is a long document, the document stopping device is withdrawn and the document is discharged from the apparatus. As a result, the document can be prevented from being damaged.

What is claimed is:

1. An apparatus for sequentially copying plural sheets of documents, comprising:
   a sheet passage through which the documents are fed;
   a document platen on which the documents are copied, said document platen forming a part of said sheet passage;
   feeding means for feeding the documents onto said document platen through said sheet passage;
   stop means movable between a first position and a second position, said stop means being positioned to contact a fed document to stop it at a predetermined position on said document platen when in said first position and said stop means being positioned so as not to contact a fed document when in said second position;
   sensing means for detecting a document longer than a predetermined length prior to the document contacting the stop means; and
   control means, responsive to the detection of a document longer than the predetermined length, for moving the stop means to the second position prior to the detected document contacting the stop means.

2. The apparatus of claim 1,
   wherein said control means controls said feeding means to stop feeding the detected document when said sensing means detects that the document is longer than the predetermined length.

3. The apparatus of claim 2,
   further comprising a display for indicating a jam condition in response to the detection of a document longer than the predetermined length.

4. The apparatus of claim 1,
   further comprising conveying means for discharging the detected document from said document platen.

5. The apparatus of claim 4, further comprising a display for indicating the existence of a detected document.

* * * * *